June 7, 1927.
G. WASHINGTON
PHOTOGRAPHIC CAMERA
Filed Feb. 1, 1926
1,631,301
6 Sheets-Sheet 1
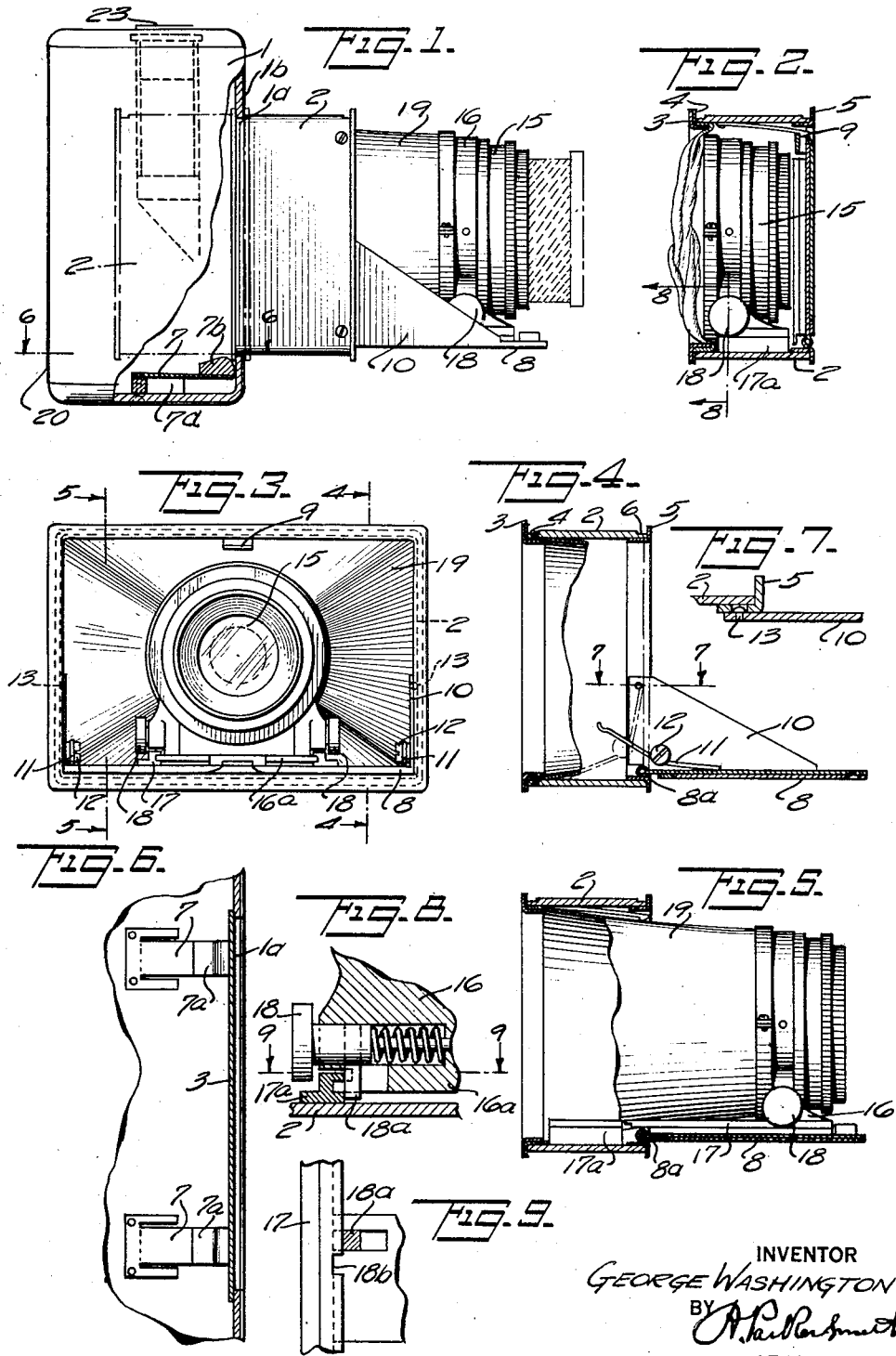
INVENTOR
GEORGE WASHINGTON
BY
ATTORNEY June 7, 1927.
G. WASHINGTON
PHOTOGRAPHIC CAMERA
Filed Feb. 1, 1926
1,631,301
6 Sheets-Sheet 2
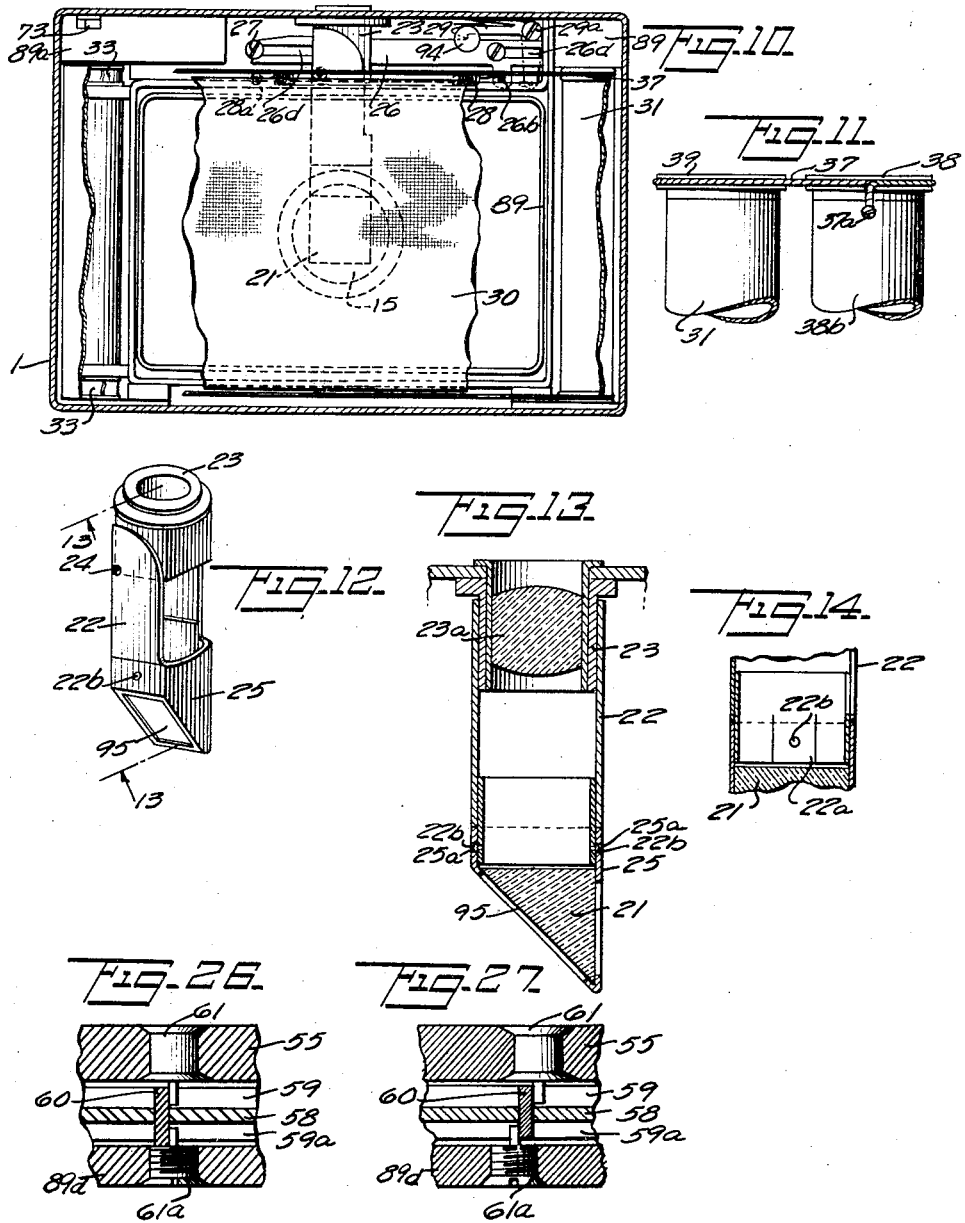
INVENTOR
GEORGE WASHINGTON
BY
ATTORNEY June 7, 1927.
G. WASHINGTON
PHOTOGRAPHIC CAMERA
Filed Feb. 1, 1926
1,631,301
6 Sheets-Sheet 3
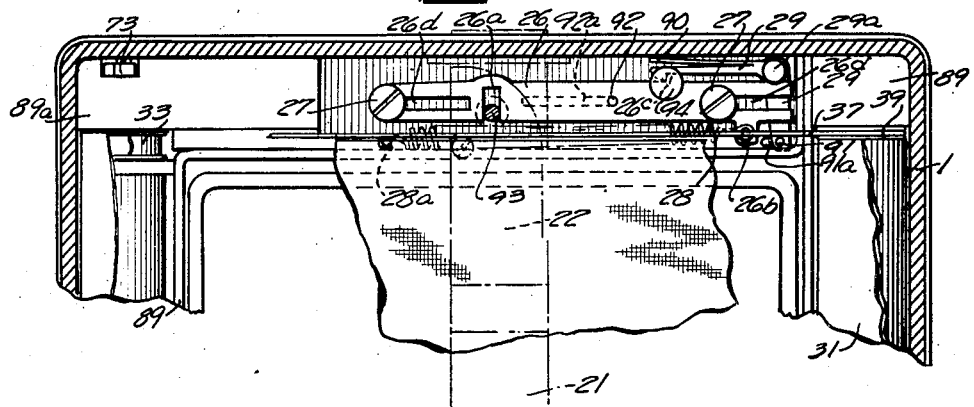
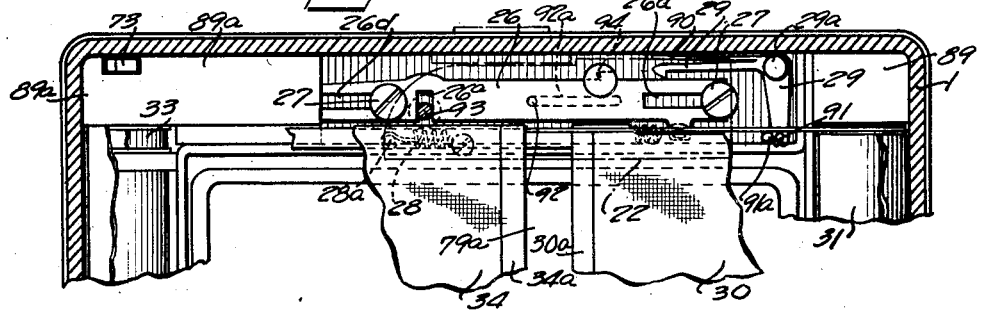
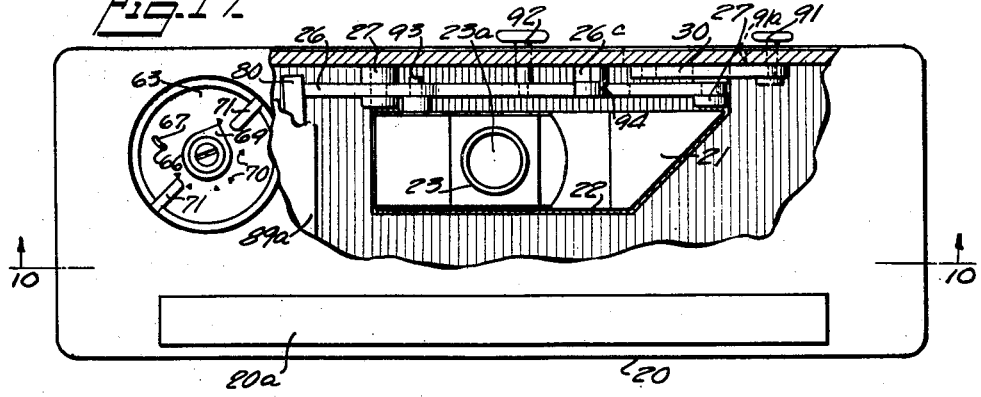
INVENTOR
GEORGE WASHINGTON
BY
ATTORNEY

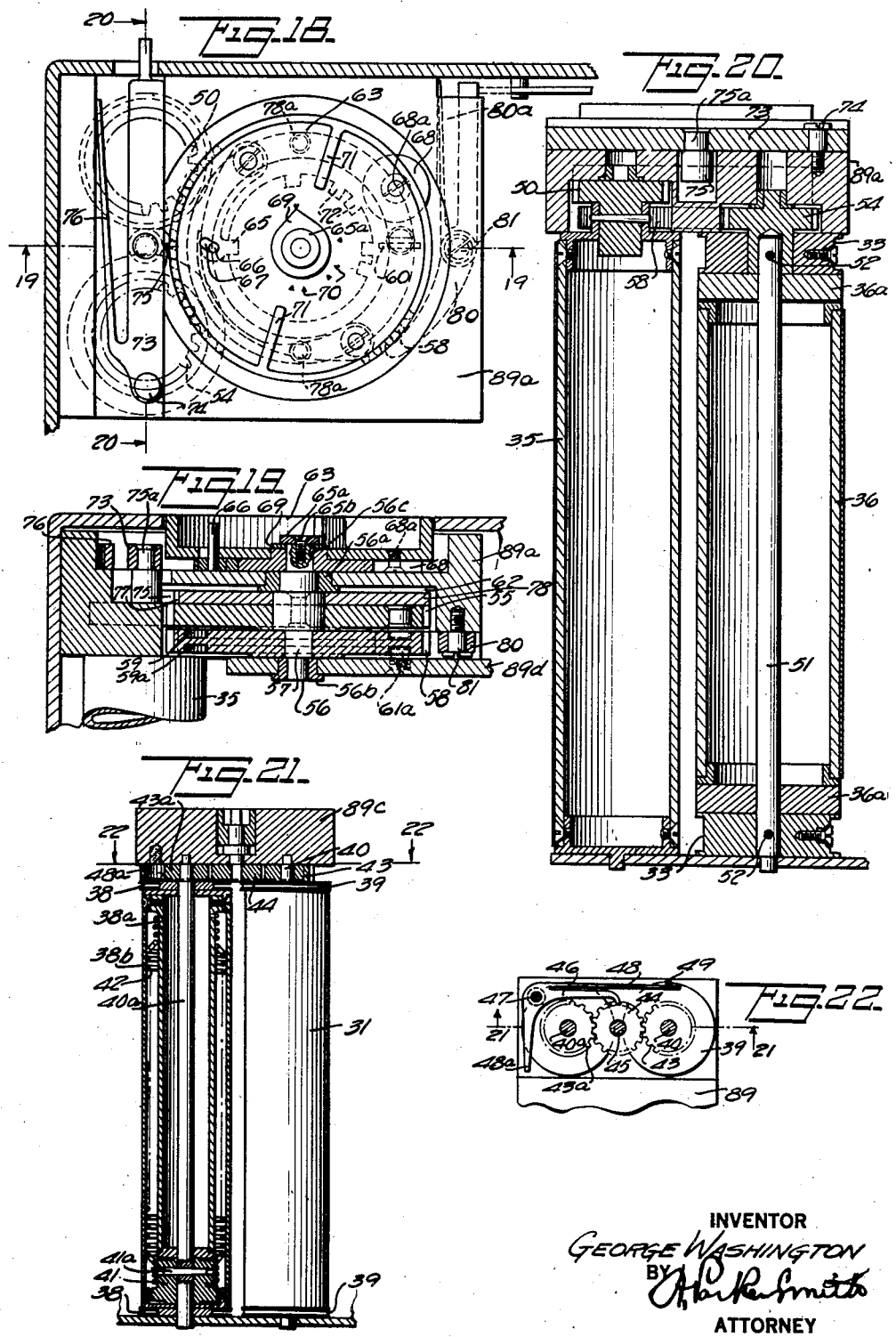

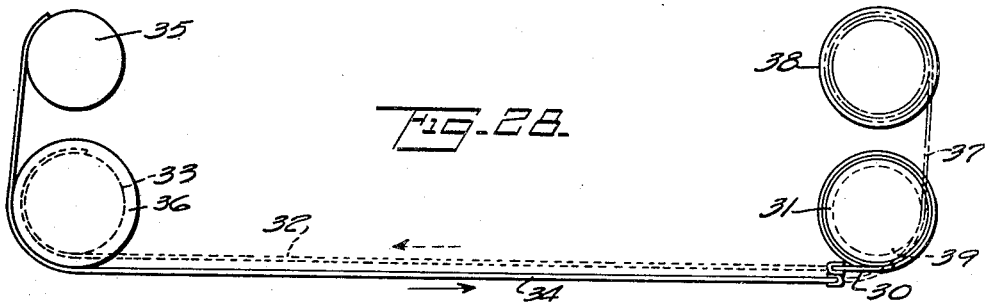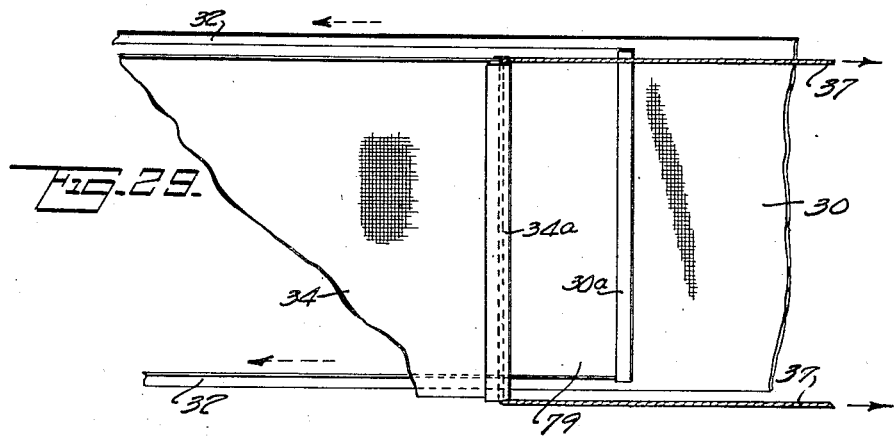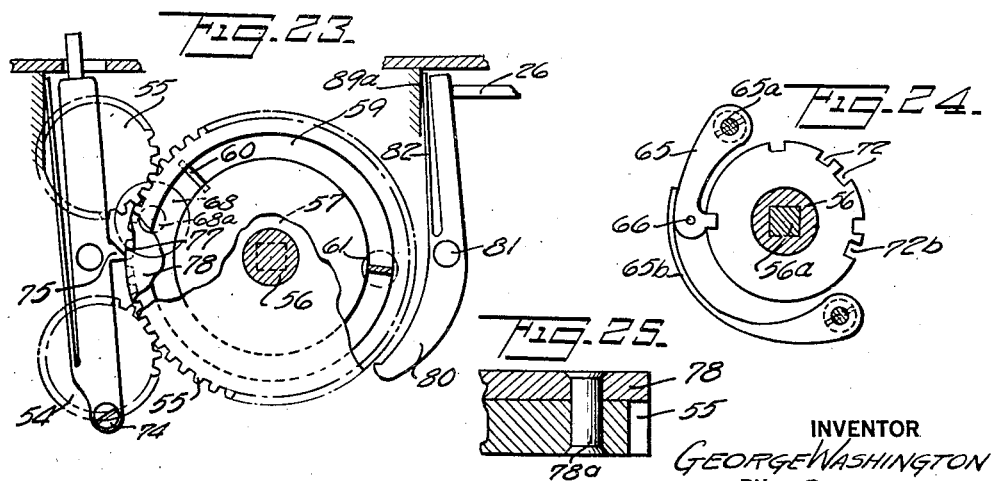

June 7, 1927.
G. WASHINGTON
PHOTOGRAPHIC CAMERA
Filed Feb. 1, 1926
1,631,301
6 Sheets-Sheet 6
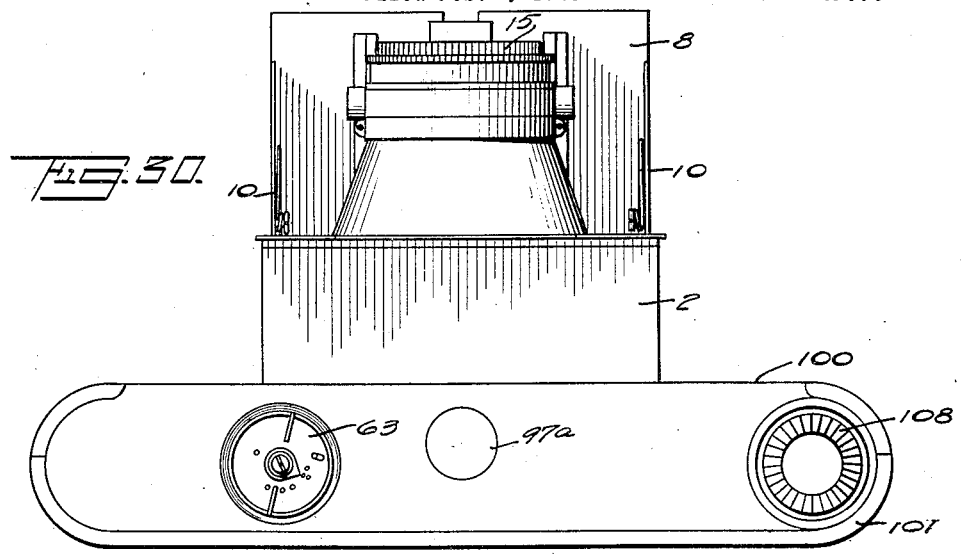
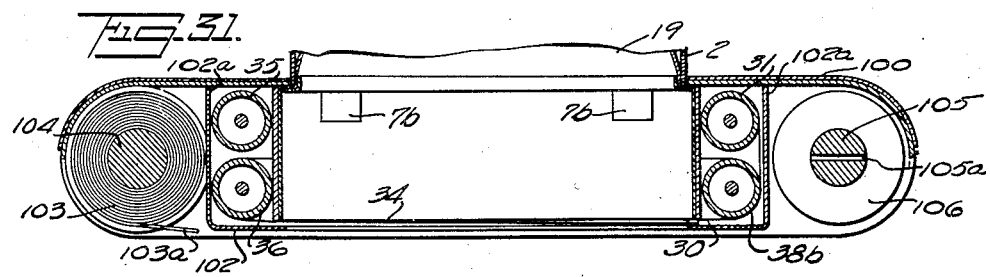
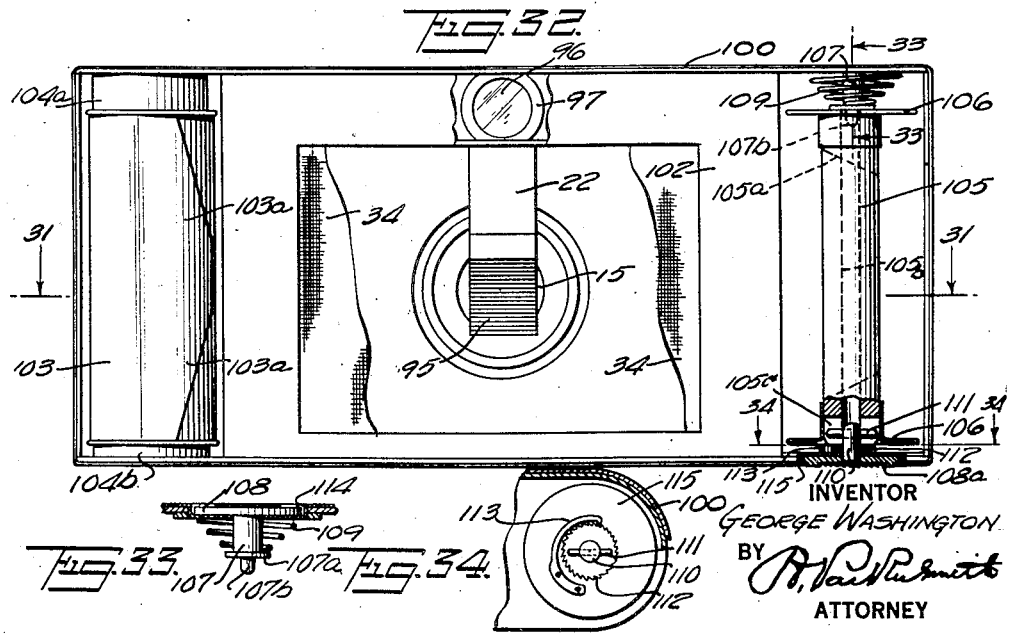
INVENTOR
GEORGE WASHINGTON
BY
ATTORNEY Patented June 7, 1927.

1,631,301

UNITED STATES PATENT OFFICE.

GEORGE WASHINGTON, OF BROOKLYN, NEW YORK.

PHOTOGRAPHIC CAMERA.

Application filed February 1, 1926. Serial No. 85,130.

My invention is primarily designed to produce a small, compact pocket camera usable with films or dry plates, and which shall have practically all the advantages of large cameras now in use, except the ability to take large pictures, and, as to this point, will be capable of taking photographs with such accuracy of detail that they may be enlarged many times without losing sharpness of outline.

To this end my invention comprises an automatic shutter mechanism accurately adjustable for widely different ranges of exposures, a finding and focusing device of great accuracy, operative without the use of the ordinary ground glass screen, and various other improvements in details of construction which will be evident on reading the subjoined description thereof.

The best form of apparatus at present known to me embodying my invention is illustrated in the accompanying six sheets of drawings in which:

Fig. 1 is a side elevation, with parts broken away or in section, showing the camera in position for taking a photograph.

Fig. 2 is a detail axial section showing the bellows extension collapsed.

Fig. 3 is a front elevation of the bellows extension and lens in operative position.

Fig. 4 is a longitudinal section on line 4—4 of Fig. 3, with parts broken away.

Fig. 5 is a similar section on line 5—5 of Fig. 3, parts being broken away.

Fig. 6 is a horizontal section with parts broken away, section being taken on line 6—6 of Fig. 1.

Fig. 7 is a detail horizontal section on line 7—7 of Fig. 4.

Fig. 8 is a detail section on line 8—8 of Fig. 2.

Fig. 9 is a section on line 9—9 of Fig. 8, showing the parts in positions assumed while the lens carriage is being drawn outward.

Fig. 10 is a vertical section on line 10—10 of Fig. 17 on a reduced scale, with parts broken away.

Fig. 11 is a detail of two of the curtain winding and unwinding rollers forming part of the shutter mechanism, parts being broken away.

Fig. 12 is a detail perspective view of the glass prism and swinging support therefor, forming part of the finding and focusing apparatus.

Fig. 13 is an enlarged cross section on line 13—13 of Fig. 12.

Fig. 14 is a detail cross section on a plane at right angles to that on which the section shown in Fig. 13 is taken, with parts broken away.

Fig. 15 is an enlarged detail of a part of Fig. 10, showing the shutter curtains in set position, with parts removed or shown on a different section plane.

Fig. 16 is a similar view showing parts in the position assumed during exposure of the plate.

Fig. 17 is a plan view of the camera in folded-up condition with parts broken away and others shown in section.

Fig. 18 is a detail plan view of the curtain setting and releasing apparatus.

Fig. 19 is a vertical cross section of the same on line 19—19 of Fig. 18, parts being broken away.

Fig. 20 is another vertical cross section taken on line 20—20 of Fig. 18, parts being broken away.

Fig. 21 is a detail vertical cross section taken on line 21—21 of Fig. 22 showing the shutter curtain take-up or winding rollers and sheaves, parts being broken away.

Fig. 22 is a horizontal cross section taken on line 22—22 of Fig. 21, parts being broken away.

Fig. 23 is a detail plan view of the shutter releasing mechanism, with parts shown in section, and others broken away.

Fig. 24 is a similar view of a part of the shutter adjusting mechanism.

Fig. 25 is a detail vertical cross section of one of the shutter gears and its attached plate, parts being broken away.

Figs. 26 and 27 are similar details showing the stops for the shutter operating gears in different positions.

Fig. 28 is a diagram of the shutter curtains and their supporting members.

Fig. 29 is a detail rear elevation of said curtains in action, parts being broken away.

Fig. 30 is a plan view of a slightly modified form of camera designed to hold photographic films.

Fig. 31 is a horizontal section thereof on line 31—31 of Fig. 32, parts being broken away or shown in section, and the back of the casing removed.

Fig. 32 is a rear elevation with parts broken away, others shown in section and with the back of the casing removed.

Fig. 33 is a detail vertical section on line 33—33 of Fig. 32.

Fig. 34 is a detail horizontal section on line 34—34 of Fig. 32, but with the lower centering pin shown in full lines.

Throughout the drawings like reference characters indicate like parts.

*General construction and casing.*

1 is the main casing enclosing the plate or film holder of any proper construction (not shown), shutter and related parts, and having a front opening 1ª in which is mounted the telescoping section 2. This telescoping section has a narrow rear flange 3 with a narrow groove 4 located immediately in front of said flange, and also a front flange 5 with a similar groove 6 just back of it. 7, 7, are vertically movable plate springs each rigidly mounted at one end in the main casing 1 on a cutaway block 7ª and carrying at its other, free end a block 7ᵇ having a beveled upper face adapted to bear against the lower edge of flange 3 when the telescoping section 2 is pulled out, as shown in Fig. 1, and against the under surface of said section 2 when the latter is pushed in, as indicated in dotted lines in Fig. 1. As a result of this construction, when the telescoping section is pulled out, the upper portion of the front plate 1ᵇ of the main frame engages groove 4, the telescoping section 2 being forced up against it by springs 7, 7; and when said section 2 is forced inward, the front groove 6 similarly is engaged by plate 1ᵇ. Consequently the telescoping section 2 is thereby elastically locked in either its inner or outer position.

8 is a flap or panel hinged at 8ª along one edge to section 2 and adapted to fill the front opening of said section when said plate is swung up into vertical position, being held in this vertical position by the spring latch 9, then engaging its upper edge. When this plate or apron 8 is swung down into horizontal position, as shown in Figs. 1, 4 and 5, it is locked in said position by laterally extending latching pins 13, 13, carried by flexible side extensions 10, 10, on said plate and engaging sockets 14, 14 (see Fig. 7), formed in the inner surface of the front portion of section 2. The springs 11, 11, pivoted or otherwise fastened to the side pieces 10, 10, at 12, 12, are flexed between the inner surface of plate 8 and the bottom of section 2, when plate 8 is thrown up into vertical position as indicated in dotted lines in Fig. 4. As a result of this last described construction, when the operator presses upward the slightly projecting end of spring latch 9, the plate 8 will be released and the springs 11, 11, will throw it down into horizontal position, pins 13, 13, thereupon snapping into sockets 14, 14, and elastically locking it in said horizontal position. To return the plate 8 to vertical position, the operator presses the elastic side pieces 10, 10 slightly inward to free pins 13, 13, from sockets 14, 14, and swings plate 8 upward until it is again caught and held by latch 9.

15 represents generally any standard form of adjustable objective lens carried by carriage 16 which is supported by base plate 16ª (see Fig. 3), which is adapted to engage grooves along the inner faces of parallel rail sections 17, 17, carried by plate 8, or the shorter extension rail sections 17ª, 17ª, mounted on the bottom of section 2. Buttons 18, 18, are connected to spring-pressed friction locks, one of which is shown at 18ª (see Fig. 8), which locks are adapted to hold carriage 16 in any position of adjustment on rails 17 or 17ª and particularly to engage notches 18ᵇ in rails 17, 17, (see Fig. 9) to lock the lens carriage 16 in its outer position of adjustment. A bellows extension or hood 19 connects lens 15 with the rear of telescoping section 2.

In operating this portion of the invention to shut up the camera the user presses buttons 18, 18, inward, between thumb and forefinger, to release the locks 18ª then engaging rail sections 17, 17, and pushes the carriage 16 back into section 2 before swinging plate 8 up to close the camera and allowing latch 9 to engage and hold it. Conversely, on opening the camera, after releasing latch 9 and permitting springs 11, 11, to swing plate 8 down, the operator releases the carriage from rail sections 17ª, 17ª, by pressing inward buttons 18, 18, and pulls the carriage out into operative position shown in Fig. 5, and then, by releasing buttons 18, 18, locks the carriage and the lens in this operative position.

The general method of operating the camera, therefore, is as follows: Assuming the camera to be in collapsible condition for transportation, when it is to be used the operator first trips latch 9 with his thumb nail and allows springs 11, 11, to swing plate 8 down into the position shown in Figs. 1, 3, 4 and 5. He then pushes telescoping section 2 downward to free groove 6 from front plate 1ᵇ, (thereby flexing springs 7, 7,) and pulls it out into the position shown in Fig. 1 and, grasping carriage 16 by buttons 18, 18, pulls out the lens, extending the bellows hood 19 usually to the full extent as shown in Fig. 5, although he may leave it in an intermediate position if he so desires. He then adjusts the focus of the lens, usually by rotating one member of the lens holder so as to bring it out into the dotted line position shown in Fig. 1 which will enable him to see through the eye-piece lens 23$^a$ (Fig. 13) a clearly defined image of the object, and then trips the shutter mechanism hereinafter to be described.

*Finding and focusing mechanism.*

When finding the object and focusing the lens so as to get a clear view of it, the image, instead of being projected upon the usual ground glass plate at the back of the camera, is reflected upward by the film 95 of quicksilver on the back of glass prism 21 supported in the holder 25 which slips on to the lower end of the swinging member 22 which is pivoted at 24 to the nipple 23 which also serves as the holder for a magnifying lens or eye-piece 23$^a$. The particular means here illustrated for removably supporting the prism holder 25 from the lower end of swinging member 22, comprises spring tongues 22$^a$ in the lower end of member 22 (see Figs. 13 and 14), provided with pins 22$^b$, adapted to engage holes 25$^a$ in the prism holder 25 when the latter is slid up into the position shown in Figs. 12 and 13.

The preferred means for holding the prism 21 down in operative position in the focal axis of the lens 15 during the focusing operation, and for swinging it quickly out of the field of the lens 15 before the sensitized plate is exposed for the purpose of taking the picture is shown in detail in Figs. 10 15, 16 and 17. They comprise a horizontal slide bar 26 having longitudinal slots 26$^d$, which are engaged by guide pins 27, 27, set in the inner surface of the camera casing 1, and means for sliding said bar on said pins. Said slide bar has a transverse vertically arranged notch 26$^a$ engaging a pin 93 carried by member 22, and the tension spring 28 is fastened to the camera casing at one end by pin 28$^a$, and at the other end connected to the lug 26$^b$ on the under side of the bar 26. Obviously, when the bar 26 is free to slide, spring 28 will pull it to the left, (looking at Figs. 10, 15, 16 and 17) and then, vertical slot 26$^a$ engaging pin 93 will swing member 22 and the prism carried by it up into the position shown in Figs. 16 and 17 out of the field of lens 15. A pin 92 carried by bar 26 extends out through slot 92$^a$ in the camera casing 1 so that it may be grasped by the operator and employed as a means for forcing bar 26 to the right into the position shown in Figs. 10 and 15, thereby swinging member 22 down into the vertical position shown in Figs. 10 and 15. When this is done, the beveled projection 26$^c$ extending laterally from a disc 94 set in the upper edge of the bar 26 is caught by the bell-crank latch 29, pivoted at 29 to the camera casing and normally held down in engaging position by spring 90. There is a pin or trigger 91 carried by the other arm of bell crank latch 29 and projecting through a short slot 91 in the camera casing 1 so that when the operator pushes said pin or trigger to the left, it swings bell crank latch 29 in a clockwise direction, (looking at Figs. 10, 15, 16 and 17) and frees the latch from the beveled projection or lug 26.

The finding and focusing operation for a camera equipped with the above described apparatus is, therefore as follows:

The parts being in the position shown in Figs. 16 and 17, the operator pushes the pin 92 to the right, thereby moving bar 26 into the position shown in Fig. 15 and further extending spring 28 until the latch 29 drops down over projection 26$^c$ and locks the parts in that position. This operation has swung member 22 and prism 21 down into the position shown in Figs. 10 and 15 with the prism in the focal axis of the lens 15. The operator, on looking down through lens 23$^a$, sees an image of the object projected through lens 15 and reflected by the mirror film 95 carried by prism 21 and can then accurately focus said lens 15. When this focusing is accomplished he pushes pin 91 to the left, thereby lifting latch 29 and freeing bar 26 so that it is quickly slid into the position shown in Fig. 16, thereby swinging member 22, and prism 21, up into their horizontal positions shown in Figs. 16 and 17 and out of the field of lens 15 so that when the shutter is opened (by mechanism hereinafter described) a sharply defined picture of the object is then projected on the sensitized plate in holder 20$^a$ and without interference from member 22 and prism holder 25.

Considering the essential elements of the above described structure it is apparent that the magnifying lens 23$^a$ corresponds to the eye-piece of a telescope, that the adjustable lens 15 corresponds to the adjustable lens or object glass of such telescope, and that the path of the light rays through said lenses 15 and 23$^a$ is bent at right angles by the film of light-reflecting material 95 applied to the rear face of prism 21. The plane of the reflecting surface so formed is, as shown, inclined 45 degrees to the axes of both lens 15 and lens 23, and the cross section of prism 21 is preferably that of a right angled isosceles triangle, with the reflecting film 95 applied to that face which forms the base of the isosceles triangle, as shown in Fig. 13.

Among the advantages of this portion of my invention may be mentioned the following: While the camera may be made of small size and very compact when collapsed, the telescopic finding and focusing apparatus described enables the operator to accurately focus lens 15 without the use of any ground glass screen and instead of having to estimate the distance and then focus the lens approximately for that distance by rule, as is the case with ordinary pocket cameras. The use of the prism with the reflecting film 95 on its inclined surface produces a clear reflection of the image to the eye of the operator, there being no double reflection, such as is usual when an ordinary inclined mirror is used for this purpose, the front surface of such mirror producing one reflection and the reflecting surface on its back another. The vertical face of the prism 21 through which the rays of light enter being at right angles to said rays and the horizontal face through which the reflected rays pass to the eye-piece 23ª being also at right angles to said reflected rays, there is no refraction of these rays either when entering or when leaving the prism. The mounting of the prism on a swinging member used as a part of the finding mechanism and movable in a plane parallel to the sensitized surface reduces the space occupied by this portion of the apparatus to the smallest possible amount.

It is understood, of course, that the eye-piece lens 23ª should have a focal length such that its focal plane will exactly coincide with the focal plane of the objective lens 15, reflected from the mirror surface 95. Of course, also the distances from the objective lens 15 to the film or sensitized plate 20, is such that when the mirror and prism 21 are swung out of the field of the lens, said focal plane will coincide with the surface of plate 20 in the usual way.

Shutter mechanism.

As shown in the drawings the preferred form of focal plane shutter mechanism comprises generally two curtains adapted to be set so that one, which I will call the main curtain, is unwound from a spring roller and extends over the face of the photographic film or plate protecting the sensitized surface thereof from the light rays entering through the adjustable lens 15 while the other, which I will call the follow-up curtain, is wound up on a setting roller, ready to be unwound therefrom and to follow the main curtain across the face of the film or plate at an adjustable predetermined distance behind said main curtain when the two curtains are released and the main curtain rewound on its spring roller. The length of the open space between the rear end of the moving main curtain and the forward edge of the moving follow-up curtain, determines the period of time during which any given point on the photographic surface within the field of the lens 15 is exposed to the action of the light rays, both curtains moving at the same speed while both are crossing said lens field, but the starting of the follow-up curtain being more or less delayed by an adjustable, automatic releasing device according to what length of time of exposure of the sensitized surface may be desired.

In the drawings 30 is the main curtain (see Figs. 10, 28 and 29) adapted to be wound up on its spring roller 31 when traveling from left to right as shown by the full line arrows in Figs. 28 and 29. Said roller 31 is journaled on frame 89 near the right hand end of casing 1 (Figs. 10, 16 and 28). Said main curtain 30 may be unwound from spring roller 31 (when the shutter mechanism is set) by tension of ribbons 32, 32, attached to the corners of its rear edge, said tension being applied toward the left in the direction of the dotted arrows in Figs. 28 and 29, by winding said ribbons on setting and releasing sheaves 33 located near the left hand end of said casing 1, and also journaled on frame 89. The follow-up curtain 34, when the shutter is set, is wound up on the setting and releasing roller 35 (Figs. 20 and 28), journaled on frame 89 near the left hand end of casing 1. The forward end of said follow-up curtain 34 then extends around idler roller 36 (Figs. 10, 20 and 28) freely mounted on shaft 51 carrying sheaves 33, and it is caused to follow the main curtain 30 over the photographic film or plate (when released) by the tension of cords 37, 37, attached to the corners of its forward edge, said cords passing around idler sheaves 39, 39, (Figs. 21 and 28) freely mounted on the shaft 40 on which main curtain roller 31 is spring mounted, and being wound up on sheaves 38, 38, (Figs. 21, 28 and 11) which are fast on either end of spring driven barrel 38ᵇ, journaled near the right hand end of casing 1 on frame 89, back of said main curtain roller 31 (looking at Figs. 28 and 10). In Fig. 28 the parts are shown in the position reached after the shutter mechanism has been operated and the photograph taken. In Fig. 29 the two curtains are shown in the act of traveling across the field of lens 15, the space 79 between them representing the area of the film exposed at any one instant. In Fig. 16 the shutter is also shown in operation but with a narrower space 79ª between the curtains, producing a shorter exposure of the sensitized surface to the light rays coming through lens 15. In Fig. 10 the parts are shown in the position assumed when the shutter is set, with main curtain 30 unwound and stretched across the lens field before the film or sensitized plate. 30ª is a stiffening strip for the free rear end of main curtain 30, and 34ª is a similar stiffening strip for the free, forward end of follow-up curtain 34.

The spring mechanism for winding up main curtain 30 and unwinding follow-up curtain 34 is illustrated in Figs. 21 and 22.

Spring driven take-up sheaves 38 for cords 37 connected to follow-up curtain 34 are loosely mounted on shaft 40ª to which hub 41 is fastened by pin 41ª. This hub serves as an anchorage for one end of coiled spring 42, the other and upper end thereof being fastened to the cylinder 38ª, which in turn is fastened to the inside of the hollow cylinder 38ᵇ, to the ends of which sheaves 38 are fastened. Gear 43ª is fast on the upper end of shaft 40ª and meshes with gear 44 on winding shaft 45. Gear 44 is held in adjusted position by pawl 46, pivoted to frame 89 in block 89ᶜ at 47 and held in engagement with gear 44 by spring extension 48 resting against fixed pin 49. In the same way roller 31, to which main curtain 30 is attached at its forward end, is loosely mounted on, and spring connected to, shaft 40, by an interior coiled spring (not shown) and on the upper end of shaft 40 is gear 43 which also meshes with gear 44. A rigid projection 48ª from pawl 46 can be reached by the operator through an opening in the casing to trip the pawl if it is desired to relieve the tension of these winding springs. By either winding up the shaft 45 in a clockwise direction (looking at Fig. 22) to increase the spring tension, or by releasing the pawl and allowing shaft 45 to rotate in a counter-clockwise direction, the tension of the actuating springs can be regulated. Cords 37 may be fastened to barrel 38 by means of screws, one of which is shown at 37ª in Fig. 11. The tension of springs 42 may be adjusted by initially winding them up by a key applied to the squared end of shaft 45. They will act from pawl 46 as an anchorage to produce independent tension on sheaves 38 and roller 31 tending always to roll up main curtain 30 and to unroll follow-up curtain 34.

The shutter setting and releasing mechanism is shown assembled in Figs. 18, 19 and 20, and in detail in Figs. 23 to 27. This setting and releasing mechanism consists generally of two gears 55 and 58 which are mounted concentrically one with another on or around shaft 56. Gear 55 meshes with a pinion 50 (see Figs. 19 and 20) fast on follow-up curtain setting roller 35, and gear 58 meshes with pinion 54 which is rigidly connected with the sheaves 33, 33, on which ribbons 32 from main curtain are wound. This shaft 56 is journaled in bearing 56ª in bearing block 89ª, and in bearing 56ᵇ set in fixed plate 89ᵈ (see Fig. 19). Gear 58 is fast on shaft 56, being mounted on the squared portion 57 thereof. Gear 55 rotates freely on shaft 56 but has a connection with gear 58 by which it may be driven by the latter in a counter-clockwise direction looking at Fig. 18. This connection comprises a pin 61 projecting from the lower surface of gear 55 into a groove 59 in the upper surface of gear 58 and cooperating with a stop 60 which stretches across said groove 59 (see Figs. 19, 23, 26 and 27). 59ª is a similar groove in the under face of gear 58, across which stop 60 also extends to cooperate with pin 61ª, set in fixed plate 89ᵈ and projecting into said groove to limit the curtain setting rotation of gears 55 and 58 to one nearly complete revolution. On the upper end of shaft 56 is fastened the cupped disc 63 loosely held on the end of shaft 56 by plate 65ª and screw 65ᵇ (Fig. 19).

It is evident that when this disc 63 is rotated in a counter-clockwise direction (looking at Fig. 18) gear 58 will rotate with it and, as the stop 60 thereon is in contact with pin 61, movement of disc 63 in a counter-clockwise direction will also be transmitted to gear 55. Such motion of cupped disc 63 is therefore transmitted simultaneously to roller 35, to wind up and set follow-up curtain 34, through pinion 50 fast on said roller and meshing with gear 55, and also to sheaves 33, 33, for winding up ribbons 32 and thereby unwinding and setting main curtain 30, the motion being transmitted to said sheaves 33, 33, through pinion 54 on shaft 51, said pinion meshing with the lower gear 58. Pinion 54, sheaves 33, and shaft 51, are held together by pins 52 (Fig. 20). This system of gearing is held in shutter setting position by pawl 80, pivoted to block 89ª, at 81, and held in engagement with gear 58 by spring extension 82 bearing on the side wall of the recess 80ª, in the block 89ª, in which said pawl is mounted, as best shown in Figs. 18, 19 and 23. When said pawl is released, by swinging its projecting end to the left (looking at Figs. 18 and 23), gear 58 and consequently sheaves 33 are left free to rotate and main curtain 30 thereupon starts winding up on its spring roller 31, traveling from left to right (Figs. 10, 28 and 29) and beginning to expose the film to the light rays entering through lens 15. The film or sensitized plate is supported in any convenient way against the back 20, (see Figs. 1 and 17) of casing 1. In Fig. 17, a plate holder is indicated at 20ª.

The means for releasing gear 55 so that it may at the desired moment start to follow gear 58 and consequently permit follow-up curtain 34 to begin to follow main curtain 30 comprises the pawl 75 (Fig. 23) engaging notch 77 in circular disc 78; which disc is fastened to the upper side of gear 55, as by rivets 78ª (Fig. 23), this plate and the two gears 55, 58, being nested in space 62 cut out of the lower side of block 89ª, as best shown in Fig. 19. Pawl 75 is carried on the under side of lever 73 by means of the rivet 75ª and is spaced away therefrom far enough so as to lie in the plane of the disc 78 as shown in Fig. 19. Lever 73, however, lies in the plane of rotation of the anti-friction wheel or button 68 fastened to the under side of cup 63 by screw 68ª. Consequently when cup 63 rotates far enough to bring anti-friction wheel 68 in contact with lever 73 the latter will be pushed to the left against the resistance of spring 76 and carry with it pawl 75 so as to free it from the notch 77 in disc 78 and thereby release gear 55 so that it may rotate under the pull of gear 50 which is fast on roller 35, which latter is under the tension of follow-up curtain 34, thus permitting follow-up curtain 34 to start on its movement in pursuit of main curtain 30, which is already being wound up with its rear end traveling across the lens field as indicated by the full line arrows in Fig. 29.

The means for timing this movement of pawl 75 comprises mechanism for adjusting circumferentially the position of the cup 63, and the anti-friction wheel 68 carried thereby, with reference to shaft 56, which latter rotates with gear 58 and therefore moves synchronously with the main curtain 30. The preferred means for producing this adjustment herein illustrated comprises the disc 64 set on the squared upper portion 56ᶜ of shaft 56 and provided with a series of notches 72, 72 which may be engaged by a pawl 65 (see Figs. 18 and 24) pivoted at 65ª on the under side of cup 63. This pawl is held in engagement by spring 65ᵇ also fastened to the under side of cup 63 and has an upwardly projecting pin 66 passing through a slot 67 in cup 63. By pulling pawl 65 out of engagement with any of the notches 72 and rotating the cup, said pawl can be allowed to drop into any other notch and so determine the angular advance or retardation of friction wheel 68 with reference to shaft 56. If the pawl 65 engages the particular notch with which it is shown in engagement in Figs. 18 and 24, it is evident that cup 63 must make nearly two-thirds of a revolution before wheel 68 will strike lever 73 and release the follow-up curtain, which will result in a long exposure of the film or plate. If, on the other hand, pawl 65 is shifted over into engagement with notch 72ᵇ, (Fig. 24) the friction wheel 68 will be located very close to lever 73 when the shutter is set, and will strike said pawl before cup 63 has rotated through more than a few degrees, with the result that the follow-up curtain will then be released soon after the main curtain has begun to move, and only a narrow open space 79ª will be left between the two curtains as they are traveling across the field of the lens as indicated in Fig. 10. If pawl 65 were dropped into one of the intermediate notches 72 then an opening of intermediate extent would exist between the two curtains while they were traveling across the field of the lens, as indicated at 79 in Fig. 29. In all cases, the period of exposure of the film will vary directly as the width of the space 79 or 79ª.

Idler roller 36 is separated from sheaves 33 by intermediate members 36ª shown in Fig. 20 so that motion of either may not be transmitted to the other by frictional contact.

The proper setting of pawl 65 in the proper notch 72 to produce an exposure of a given fraction of a second may be indicated by a pointer 69 (Figs. 18 and 19) fast on the upper end of shaft 56 and swinging over the division points 70, marked on the upper surface of cup 63. Short radial ribs 71, 71, on the upper surface of cup 63 serve as convenient means for grasping said cup for this adjustment and also when winding up the shutter setting mechanism. The outer end of the tail or pawl 80 is in line with sliding bar 26 (see Figs. 17 and 18) so that when released from latch 29 this bar trips pawl 80 and releases the shutter curtain 30.

The complete operation of setting and releasing the shutter mechanism for any desired time exposure therefore is as follows: Locking pawl 65 is first dropped into engagement with that notch 72 which will give the desired exposure. This also locks cupped disc 63 to shaft 56 so that the operator may grasp the cup by lugs 71, 71, and rotate the cup disc 63, shaft 56, and gear 58 in a counter-clockwise direction, beginning the unwinding of main curtain 30 from its spring roller 31 and drawing it across the field of the lens in the direction of the dotted arrows in Figs. 28 and 29, and also (stop 60 in gear 58 being in contact with pin 61 on gear 55 as shown in Fig. 27), simultaneously winding up follow-up curtain 34 on its roller 35. It is obvious that when the shutter parts are in the released condition assumed after an exposure, the stop 60 is (as shown in Fig. 27) bearing against the side of fixed pin 61ª opposite to that against which it is shown as bearing in Figs. 18 and 26, which latter show the set position, with the shutter ready to be released for an exposure. One complete revolution of the gears 55 and 58 in a counter-clockwise direction completes the unwinding of curtain 30 from its spring roller 31 and the winding up of curtain 34 on its setting roller 35, and brings the parts into position shown in Fig. 18, pin 61ª serving as a stop for this winding-up operation. Thereupon pawl 75, dropping into notch 77 on disc 78, holds the follow-up curtain in such position, while main curtain 30 is held in unwound position by pawl 80. When pawl 80 is tripped by pushing its exposed end to the left the gear 58 is released and begins to rotate together with cup 63. The winding up of curtain 30 then starts and begins to expose the film, and whenever wheel or button 68 comes into contact with lever 73, pawl 75 is withdrawn from engagement with notch 77 in plate 78, gear 55 is also released, and follow-up curtain 34 also begins to move under tension of its cords 37 which are thereupon wound up on spring driven sheaves 38. The tensions of the springs driving roller 31 and sheaves 38 being substantially equal, the two curtains travel across the lens field at the same speed, and, after curtain 30 has been completely wound up, stop 60 on gear 58 strikes the other side of fixed pin 61ª (looking at Fig. 19) preventing further motion of said curtain. Curtain 34 continues to follow curtain 30 until notch 77 again comes opposite pawl 75, or pin 61 strikes stop 60, when its further movement is arrested with these parts in the positions shown in Figs. 27 and 28. The position of the timing parts just after pawl 75 has been tripped and the follow-up curtain has begun to move are shown in Fig. 23. After pawl 75 has been withdrawn from notch 77 it rides on the periphery of disc 78 as also shown in Fig. 23.

If it is desired to release follow-up curtain 34 manually, this can be done by pushing over the projecting end of lever 73. This enables the operator to make a time exposure by holding out pawl 64, thus disabling the automatic trip for curtain 34, and then controlling the follow-up curtain by manipulating lever 73.

The mode of operating the herein described camera, assuming it to be folded up as for carrying in the pocket, is as follows: The parts are brought into operative position shown in Fig. 1 as previously described. The projecting pin 92 is then pushed to the right into the position shown in Figs. 10 and 15, thus swinging the prism 21 down into the field of lens 15 (as shown in Figs. 10 and 15). Latch 29 locks the parts in this position.

At or before this time the operator sets the shutter winding apparatus for the desired exposure (as above described). Then he winds up the shutter by grasping ribs 71, 71, on cup 63 and rotating the latter in a counter-clockwise direction until further rotation is checked by stop 60 coming against pin 61ª as shown in Fig. 26. Pawl 80 will then hold the shutter parts in the set position and all that remains is to focus lens 15. To do this the operator looks down through eye-piece lens 23ª at the reflection of the object toward which the camera has been directed, which reflection is thrown up by the film 95 of quicksilver on the back of prism 21, and varies the focus of lens 15 (as indicated in broken lines in Fig. 1) until he sees a perfectly defined image of the object. This means that if the prism 21 be then swung up out of the field of the lens 15, and the shutter curtains released, exactly the same image of the object which the operator sees will be projected on the film or sensitized plate, when the shutter opens, and if said plate is so exposed for a certain definite fraction of time, a similarly perfect photograph will result.

To accomplish this the operator pushes pin 91 (Fig. 17) to the left, thereby tripping latch 29 and freeing sliding bar 26, which thereupon moves to the left swinging prism 21 out of the field of lens 15 and releasing the shutter curtains by tripping shutter pawl 80. This sends the curtains 30 and 34 traveling across the object lens field at the predetermined distance apart suited to produce the exposure necessary for the existing light conditions, and the operation is over so far as the camera is concerned.

The carriage 16 is then run back into telescoping section 2, flap 8 swung up, and section 2 forced back into the main casing 1, thus shutting up the camera for storage or transportation.

The combined mechanism for setting and adjusting the shutter, focusing the lenses and releasing the shutter above described is particularly compact and simple in operation and (as above explained) can be readily operated automatically for ordinary exposures, or manually controlled in cases where an extra long exposure is required.

Figs. 30 to 34 illustrate a slightly modified form of camera especially designed for handling photographic films instead of plates. 100 represents the main casing in which is mounted the telescoping member 2 with the hinged front plate 8 adapted to support the lens carriage 16 supporting the objective lens 15. The collapsible hood 19 connects casing section 2 with lens carriage 16 and 10, 10 are the supports for the plate 8. The swinging member 22 of the finding and focusing device supports a prism at its lower end provided with the reflecting surface 95 on its back, as before described, but instead of the magnifying lens 23ª shown in Fig. 13, through which the reflected image of the object to be photographed is viewed in a vertical direction, I have here shown a lens 96 set in a thimble 97 through which the object may be viewed in a horizontal direction by means of a second prism, not shown, but illustrated and described in my pending application Serial No. 85,128 filed of even date herewith. When using this form of the invention the operator can hold the camera up before his eyes while focusing the lens, looking through eye-piece lens 96. The second prism may be supported from a plug 97ª inserted in the top of main casing 100 (see Fig. 30).

101 is a removable back for main casing 100. A rectangular frame 102, having side wings 102ª, 102ª, is adapted to slip over and enclose the shutter curtains which, together with their supporting and guide rollers, are shown in outline in Fig. 31. 63 is a cup-shaped disc by which the shutter may be set and wound up.

103 represents the usual roll of photographic film provided with the end tab 103ª for pulling it across the main casing 100 between the rectangular frame 102 and the casing back 101. The rectangular opening in the frame 102 then determines the area of film exposed to the action of the light rays entering through the objective lens 15 when the shutter is operated. 104 is the usual spool on which said film is wound for storage and transportation, as well as for use, which spool is supported between the upper and lower bearing blocks 104ª, 104ᵇ as best shown in Fig. 32. When the camera is to be put into use the film 103 is first unrolled far enough to allow the tab 103ª to be inserted in the slot 105ª of the take-up spool 105 at the other side of the camera, so that, after successive portions of the film have been exposed for the taking of pictures, said exposed portions may be wound up on said take-up spool 105. The preferred form of take-up spool 105, as shown in the drawings, has the usual end flanges 106, 106, and is detachably supported on the upper centering pin 107 and the lower centering pin 110. Upper pin 107 is rigidly mounted on the under side of button 108, which latter is loosely journaled in the flanged bearing 114 set in the top of the main casing (see Fig. 33). Button 108 and pin 107 are normally forced downward to hold said button in said flanged bearing 114 by the spiral spring 109 which is confined between the flanged bearing 114 and the flange 107ª on the lower portion of the pin 107. Pin 107 has a lower end portion 107ᵇ which is reduced in diameter and engages a centrally bored-out portion 105ᵇ of the spool 105. The lower end of spool 105 is supported by the lower pin 110 which is carried by the lower button 108ª journaled in plate 115 fast on, or stamped up from, the bottom part of main casing 100. This pin 110 also enters the lower end of the hole 105ᵇ extending through spool 105 and is detachably locked to said spool by means of the cross pin 111 entering the transverse slot 105ᶜ in the bottom end of said spool. 112 is a small ratchet wheel rigidly mounted on pin 110 and co-operating with spring pawl 113, which latter is rigidly mounted on the fixed plate 115.

It is evident from the above construction that when the operator grasps buttons 108 and 108ª between thumb and forefinger he will compress the spool 105 between them, flange 107ª bearing on the upper end of said spool and the lower end of said spool resting on ratchet wheel 112 which is rigidly connected to lower button 108ª, it being understood that the spool 105 is of such length that when the parts are assembled as shown in Fig. 32, the upper button 108 does not quite come to a bearing in its flanged holder 114. If, then, the operator rotates buttons 108 and 108ª in a counter-clockwise direction (looking at Figs. 30, 31 and 34), he will wind a portion of the film 103 onto spool 105, and the pawl and ratchet mechanism 113, 112, will at all times prevent any unwinding action of said spool 105. Buttons 108 nad 108ª may have their outer surfaces corrugated as indicated in Figs. 30 and 32 to prevent the operator's thumb and finger slipping on them.

In loading the camera, in this form of my invention, the casing back 101 is removed, the spool of film 103 placed in position, the film tab 103ª wound up on spool 105 and the casing back replaced. The camera is then ready for operation. After each picture is taken the exposed portion of the film is wound up on spool 105, in the manner hereinbefore described, until all of the film has been used. To remove the film, the back 101 of the casing is taken off, the spool 105 pushed upward, compressing spring 109 until the hole 105ᵇ is freed from the lower pin 110, and said spool, with its winding of previously exposed film, is then removed, for development or storage of the film. An empty take-up spool may be then inserted by reversing this procedure, a new spool of film 103 placed in, and threaded across, the camera, the back 101 replaced, and the apparatus will then be ready for continued use.

The foregoing film winding mechanism is not specifically claimed, but is described and claimed in my pending application Serial No. 128,740, filed August 12, 1926, which is a division of this application.

The particular form of collapsible camera herein described, but not specifically claimed, is shown, described and claimed in my pending application Serial No. 85,127, filed February 1, 1926.

The particular forms of finding and focusing devices herein described, but not specifically claimed, are described and claimed in my pending applications Serial No. 85,128, filed February 1, 1926, and Serial No. 158,862, filed January 4, 1927.

The particular form of shutter operating mechanism herein shown and described, but not specifically claimed, is described and claimed in my pending application Serial No. 85,129, filed February 1, 1926, allowed November 9, 1926.

Various changes evidently could be made in the details of the particular embodiments of the various sub-combinations herein illustrated and described without departing from the principle of the invention so long as the general method of operation and co-operation herein indicated is preserved.

Having described my invention, I claim:

1. In a pocket camera the combination of a relatively flat casing adapted to be slipped into the pocket of a garment, a shutter curtain having winding and unwinding rollers mounted in either end of said casing, a mirror pivoted in said casing between said rollers on an axis perpendicular to the plane of said shutter curtain and adapted to either swing down into the focal axis of the camera lens or out along one edge of said curtain, and means for operating said shutter curtain adapted to be released by the outward swinging movement of said mirror, whereby said curtain is operated only after said mirror has swung out of the field of the camera lens.

2. In a photographic camera adapted for use with a roll of sensitized film, the combination of a main casing, rollers for such film located in either end of said casing, a focal plane shutter mechanism comprising two spring-operated curtains and rollers therefor located in the medial portion of said casing, and a removable frame for enclosing said shutter mechanism, which frame comprises wings adapted to be inserted between said curtain rollers and said film rollers and a partly cut-away portion connecting said wings which is adjusted to extend between said film and said curtains.

GEORGE WASHINGTON.